(12) United States Patent
Matsumura et al.

(10) Patent No.: US 7,609,485 B2
(45) Date of Patent: Oct. 27, 2009

(54) HEAD GIMBAL ASSEMBLY AND HEAD STACK ASSEMBLY HAVING ACCURATE DIMENSIONS

(75) Inventors: Satoshi Matsumura, Kawasaki (JP); Masanori Iwamoto, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 516 days.

(21) Appl. No.: 10/901,636

(22) Filed: Jul. 28, 2004

(65) Prior Publication Data

US 2005/0057861 A1    Mar. 17, 2005

(30) Foreign Application Priority Data

Sep. 12, 2003    (JP)    ............... 2003-320744

(51) Int. Cl.
*G11B 5/55* (2006.01)
(52) U.S. Cl. .................. 360/266.1; 360/244.5; 360/266
(58) Field of Classification Search ............. 360/266.1, 360/244.5, 265.6, 265.9, 266
See application file for complete search history.

(56) References Cited

U.S. PATENT DOCUMENTS

| | | | | |
|---|---|---|---|---|
| 4,875,117 | A * | 10/1989 | Slezak et al. ............. | 360/98.01 |
| 5,497,282 | A * | 3/1996 | Hoffmann et al. ........... | 360/244 |
| 5,579,190 | A * | 11/1996 | Mastache et al. ......... | 360/265.6 |
| 5,751,519 | A * | 5/1998 | Hata ........................ | 360/265.6 |
| 6,078,469 | A * | 6/2000 | Girard ...................... | 360/266.1 |
| 6,160,684 | A * | 12/2000 | Heist et al. ............... | 360/244.5 |
| 6,215,624 | B1 * | 4/2001 | Summers et al. ......... | 360/244.5 |
| 6,236,544 | B1 * | 5/2001 | Hirokawa et al. ........ | 360/266.1 |
| 6,381,099 | B1 | 4/2002 | Mei | |
| 6,751,064 | B2 * | 6/2004 | Kuwajima et al. ........ | 360/244.8 |
| 6,950,285 | B2 * | 9/2005 | Wada et al. ............... | 360/265.7 |
| 2003/0165033 | A1 * | 9/2003 | Sasaki ...................... | 360/265.9 |
| 2007/0139822 | A1 * | 6/2007 | Hashi et al. .............. | 360/265.6 |

FOREIGN PATENT DOCUMENTS

JP    2001-155458    6/2001

* cited by examiner

*Primary Examiner*—Brian E Miller
(74) *Attorney, Agent, or Firm*—Townsend and Townsend and Crew LLP; John Henkhaus

(57) ABSTRACT

Embodiments of the invention provide a head gimbal assembly and a head stack assembly suitable for a miniature magnetic disk drive, and capable of being assembled in an accurate alignment during its fabrication. In one embodiment, a fixing member is disposed in contact with a pivot, an assembly formed by combining a head gimbal assembly and a carriage assembly is put on the pivot and pressed in the direction of the arrow toward the fixing member, and is fastened to the pivot with a nut. Since the head gimbal assembly is provided with a hole to receive the pivot therein provided with two straight edges, the relative positions of the turning axis of the pivot, the head gimbal assembly and the carriage assembly are adjusted properly so that clearances between the parts are absorbed.

13 Claims, 3 Drawing Sheets

HEAD GIMBAL ASSEMBLY AND HEAD STACK ASSEMBLY HAVING ACCURATE DIMENSIONS

BACKGROUND OF THE INVENTION

The present invention relates to a head gimbals assembly and a head stack assembly for a magnetic disk drive and, more particularly, to a head gimbal assembly and a head stack assembly having accurate dimensions after its fabrication and suitable for use on a compact magnetic disk drive.

Various types of portable recording media are provided for various devices including personal computers (PCS) and digital cameras to store data. Efforts have been made in recent years to provide recording media having a small size and a large storage capacity. For example, a small, portable magnetic disk drive has been proposed. This proposed disk drive has a new assembly construction based on the Compact Flash® commercially available from SanDisk Corporation, i.e., one of standards for small memory cards.

A large-capacity miniature magnetic disk drive conforming to the standard of Compact Flash Type 2 is provided with a 1 in. diameter magnetic disk having a storage capacity of 1 GB, and has a weight on the order of only 16 g.

This portable, miniature magnetic disk drive comprises, in addition to a magnetic disk for data storage, a spindle motor for rotating the magnetic disk, a magnetic head for writing data to and reading data from the magnetic disk, a suspension assembly suspending the magnetic head, and an actuator supporting the suspension assembly to move the magnetic head in a direction along the radius of the magnetic disk.

In the progressively miniaturized magnetic disk drive, the suspension supporting the magnetic head as a mechanical component is required to be formed in a high dimensional accuracy. A suspension assembly proposed by Japanese Patent Laid-open No. 2001-155458 (p. 3, FIG. 2), includes a load beam consisting of a plate spring, i.e., an elastic member, and a beam, to reduce the influence of disturbing wind. A suspension assembly disclosed in U.S. Pat. No. 6,381,099 (Specification, cols. 3 and 4, FIG. 1) has a load beam consisting of a base part, a rigid part and an elastic part connecting the base part and the rigid part.

Efforts have been made for the further capacity enhancement and miniaturization of the portable miniature magnetic disk drive to be loaded into a portable device, and the pivot of the head stack assembly, the carriage assembly and the head gimbal assembly must be assembled in high dimensional accuracy. There are difficulties in managing the alignment of the head stack assembly of the miniature magnetic disk drive in conformity to design values. The component parts are unable to exercise satisfactory functions because severe limits are set for design regions for the component parts, the component parts must be carefully handled in assembling the same because the component parts are liable to be damaged. The lightweight head stack assembly included in the miniature magnetic disk drive operates unstably and is unable to function properly unless the alignment of the component parts is managed. Conventional techniques including techniques disclosed in the references above do not deal with the improvement of the accuracy of the alignment of the head stack assembly when it is assembled, which is a lightweight component.

BRIEF SUMMARY OF THE INVENTION

Embodiments of the present invention provide a head gimbal assembly and a head stack assembly enabling high-accuracy adjustment of alignment during its fabrication, and suitable for use on a miniature magnetic disk drive.

In accordance with an aspect of the present invention, a head gimbal assembly comprises a head arm provided with a mounting hole having two straight edges and receiving a carriage support shaft therein; a flexure having one end attached to the head arm and the other end provided with a gimbal; and a load beam attached to the flexure and capable of loading the gimbal.

Desirably, extensions of the two straight edges meet at right angles. The flexure is provided integrally with wiring lines. The head arm has at least two positioning parts each provided with a hole at positions around the mounting hole of the head arm.

In accordance with another aspect of the present invention, a head stack assembly comprises a carriage support shaft; a carriage assembly having a mounting part mounted on the carriage support shaft, and a coil; and a head gimbal assembly provided with a hole having two straight edges and receiving the carriage support shaft therein.

Desirably extensions of the two straight edges meet at right angles. The carriage assembly is provided with at least two bosses at least in two parts of the mounting part mounted on the carriage support shaft, and the head gimbal assembly has a carriage assembly positioning part provided with holes corresponding to the bosses to position the carriage assembly.

In accordance with another aspect of the present invention, a head stack assembly comprises a carriage support shaft; a carriage assembly having a mounting part mounted on the carriage support shaft, and provided with a coil; and a head gimbal assembly including a head arm provided with a hole having two straight edges and receiving the carriage support shaft therein, a flexure having one end attached to the head arm and the other end provided with a gimbal, and a load beam attached to the flexure and capable of loading the gimbal.

Desirably, extensions of the straight edges of the mounting hole, receiving the carriage support shaft, of the head arm meet at right angles. The flexure is provided integrally with wiring lines. The carriage assembly is provided with at least two bosses at least two parts of the mounting part mounted on the carriage support shaft. The head arm has a positioning part provided with holes corresponding to the bosses to position the carriage assembly.

In accordance with another aspect of the present invention, a magnetic disk drive comprises a head gimbal assembly including a head arm provided with a mounting hole having two straight edges and receiving a carriage support shaft therein, a flexure having one end attached to the head arm and the other end provided with a gimbal, and a load beam attached to the flexure and capable of loading the gimbal; a magnetic head attached to the gimbal; and a magnetic disk for writing information to and reading information from the magnetic disk.

Desirably, extensions of the straight edges of the mounting hole of the head arm receiving the carriage support shaft therein meet at right angles.

In accordance with another aspect of the invention, a magnetic disk drive comprises a head stack assembly including a carriage support shaft, a carriage assembly having a mounting part mounted on the carriage support shaft, and a coil, and a head gimbal assembly provided with a mounting hole having two straight edges and receiving the carriage support shaft; a magnetic head attached to the gimbal; and a magnetic disk to which the magnetic head write information and from which the magnetic head read information.

Desirably, extensions of the straight edges of the mounting hole of the head gimbal assembly receiving the carriage support shaft meet at right angles. The carriage assembly is provided with at least two bosses at least in two parts of the mounting part mounted on the carriage support shaft. The head gimbal assembly has a carriage assembly positioning part provided with holes corresponding to the bosses to position the carriage assembly.

In accordance with yet another aspect of the present invention, a magnetic disk drive comprises a carriage support shaft; a carriage assembly having a mounting part mounted on the carriage support shaft, and a coil; a head arm provided with a mounting hole having two straight edges and receiving the carriage support shaft therein; a flexure having one end attached to the head arm and the other end provided with a gimbal; a load beam attached to the flexure and capable of loading the gimbal; a magnetic head attached to the gimbal; and a magnetic disk to which the magnetic head write information and from which the magnetic head read information.

Desirably, extensions of the straight edges of the mounting hole of the head arm receiving the carriage shaft meet at right angles. The flexure is provided integrally with wiring lines. The carriage assembly is provided with at least two bosses at least in two parts of the mounting part mounted on the carriage support shaft, and the head arm has a carriage assembly positioning part provided with holes corresponding to the bosses to position the carriage assembly.

Embodiments of the present invention provide the head gimbal assembly and the head stack assembly enabling high-accuracy adjustment of alignment during its fabrication, and suitable for use on a miniature magnetic disk drive.

DETAILED DESCRIPTION OF THE INVENTION

Figure 3:
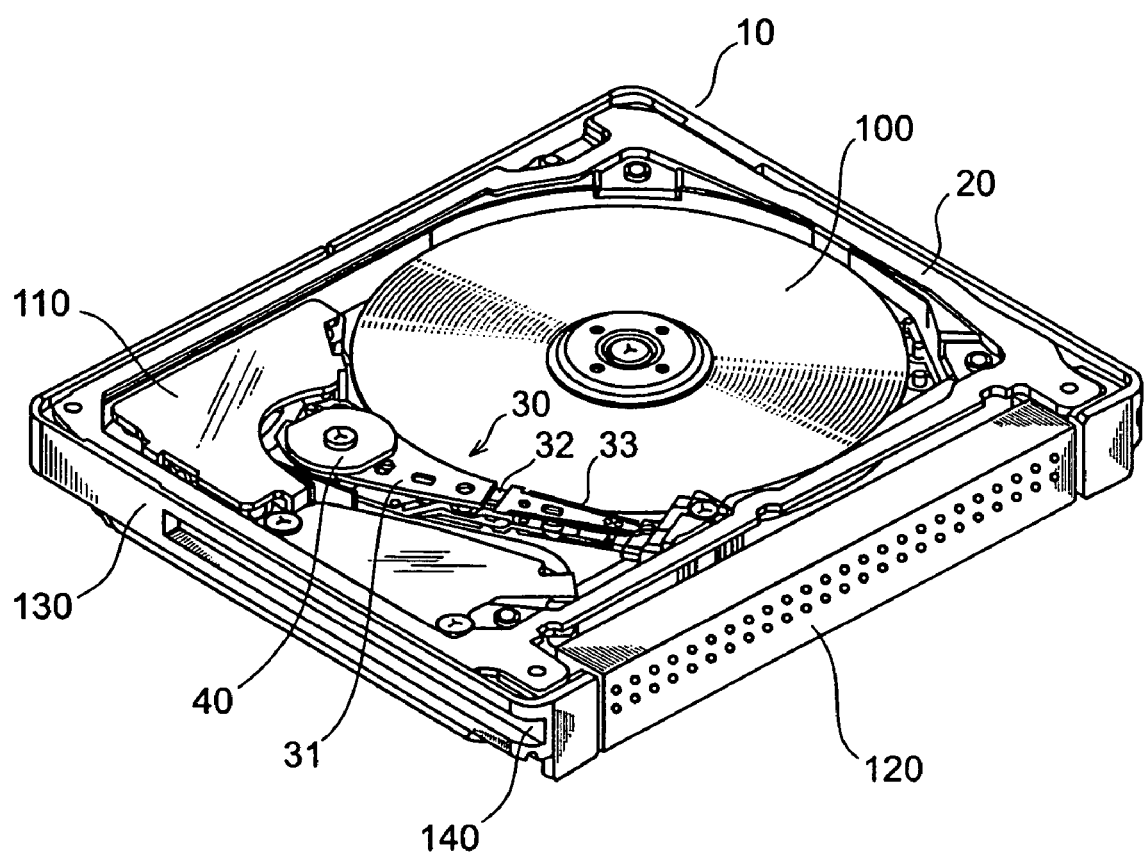
FIG. 3 is a perspective view of a magnetic disk drive provided with the head stack assembly in the embodiment.

FIG. 3 shows a miniature magnetic disk drive 10 provided with a head stack assembly in a specific embodiment according to the present invention. A magnetic disk 100 is mounted on and driven for rotation by the shaft of a spindle motor, not shown, fixed to the bottom wall of a base plate 20 having the shape of a box and formed by press working.

A carriage assembly 50 (FIGS. 1 and 2) and a head gimbal assembly 30 are mounted on a carriage support shaft (pivot) 40 pivoted on the bottom wall of the base plate 20, and are driven for turning by a voice coil motor (VCM) 110 fixed to the bottom wall of the base plate 20. The head gimbal assembly 30 is turned to move a magnetic head, not shown, held on a tip part of the head gimbal assembly 30 in a direction along a radius of the magnetic disk 100, the magnetic head is positioned relative to a desired recording track for an information read/write operation.

A structure formed by mounting the carriage assembly 50 and the head gimbal assembly 30 on the pivot 40 will be called a head stack assembly. Signal lines connected to the magnetic head are connected through a circuit board, not shown, to an interface connector 120. The interface connector 120 sends signals provided by the magnetic head to external devices.

A frame bumper 130 formed of an elastic material surrounds the base plate 20. The frame bumper 130 serving as a shock absorber is a molding provided with side slots 140. The perimeter, i.e., sides of a two-dimensional area, is covered with the frame bumper 130 and the interface connector 140 to protect the miniature magnetic disk drive 10 from lateral shocks.

FIG. 2(a) shows the component members of the head stack assembly, and FIG. 2(b) shows the head stack assembly formed by assembling the component members. The head gimbal assembly 30, the carriage assembly 50, a dummy head arm 30' and a washer 56 are mounted on the pivot 40. They are screwed and fastened on the pivot by a nut 57. The pivot 40 has a cylindrical body holding the foregoing components, and a head having a diameter greater than that of the cylindrical body, and provided with parallel flats. The cylindrical body has a threaded end part, and a nut 57 is screwed on the threaded end part. This head stack assembly provided with the dummy head 30' is used when only one of the surfaces (upper surface) of the magnetic disk is used. When both the surfaces of the magnetic disk are used, the head stack assembly is provided with two head gimbal assemblies 30.

Figure 1:
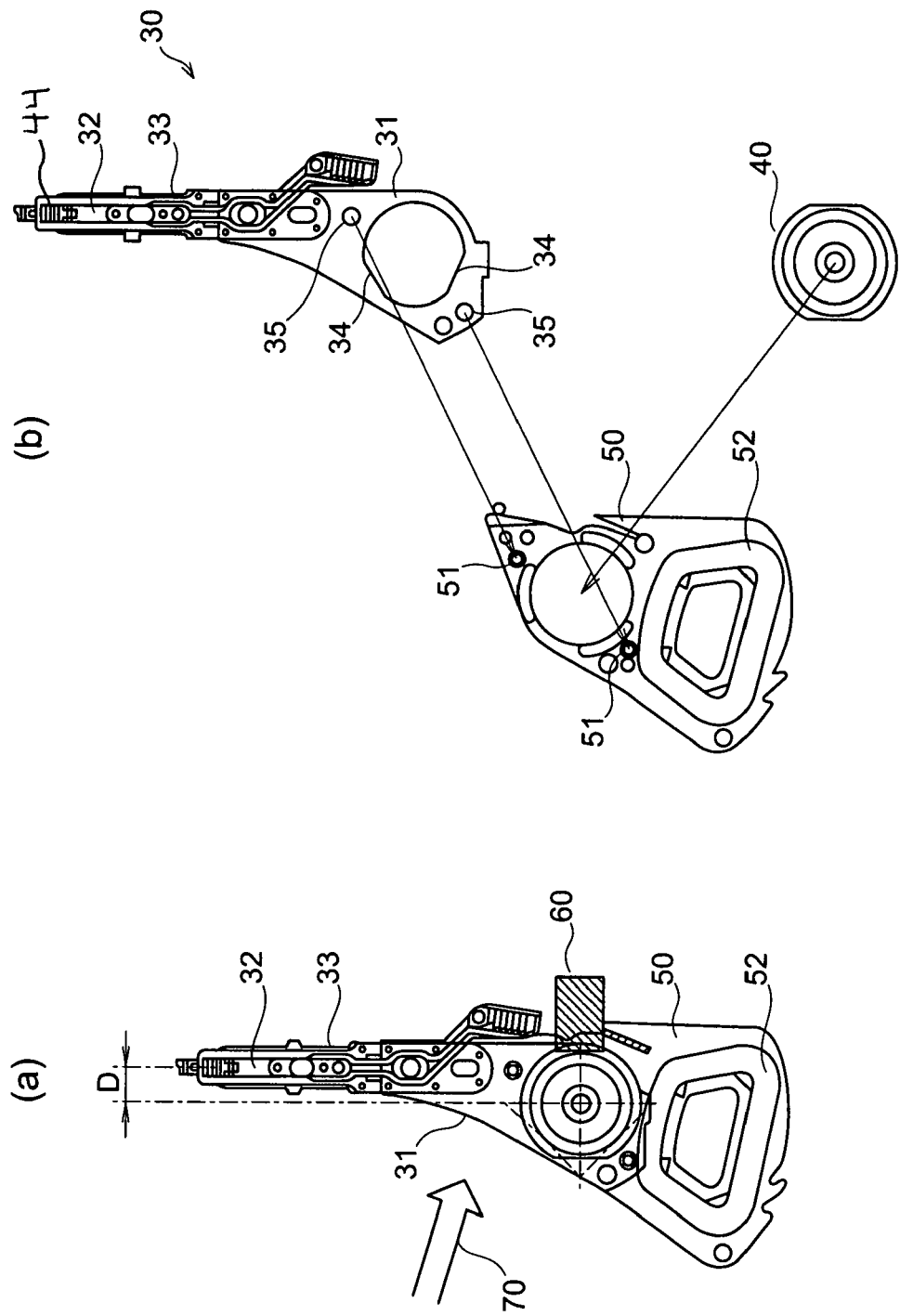
FIG. 1 is a view, taken from the side of a medium, of assistance in explaining an assembling method of assembling a head stack assembly in a specific embodiment according to the present invention, showing positional relation between the component parts.
Figure 2:
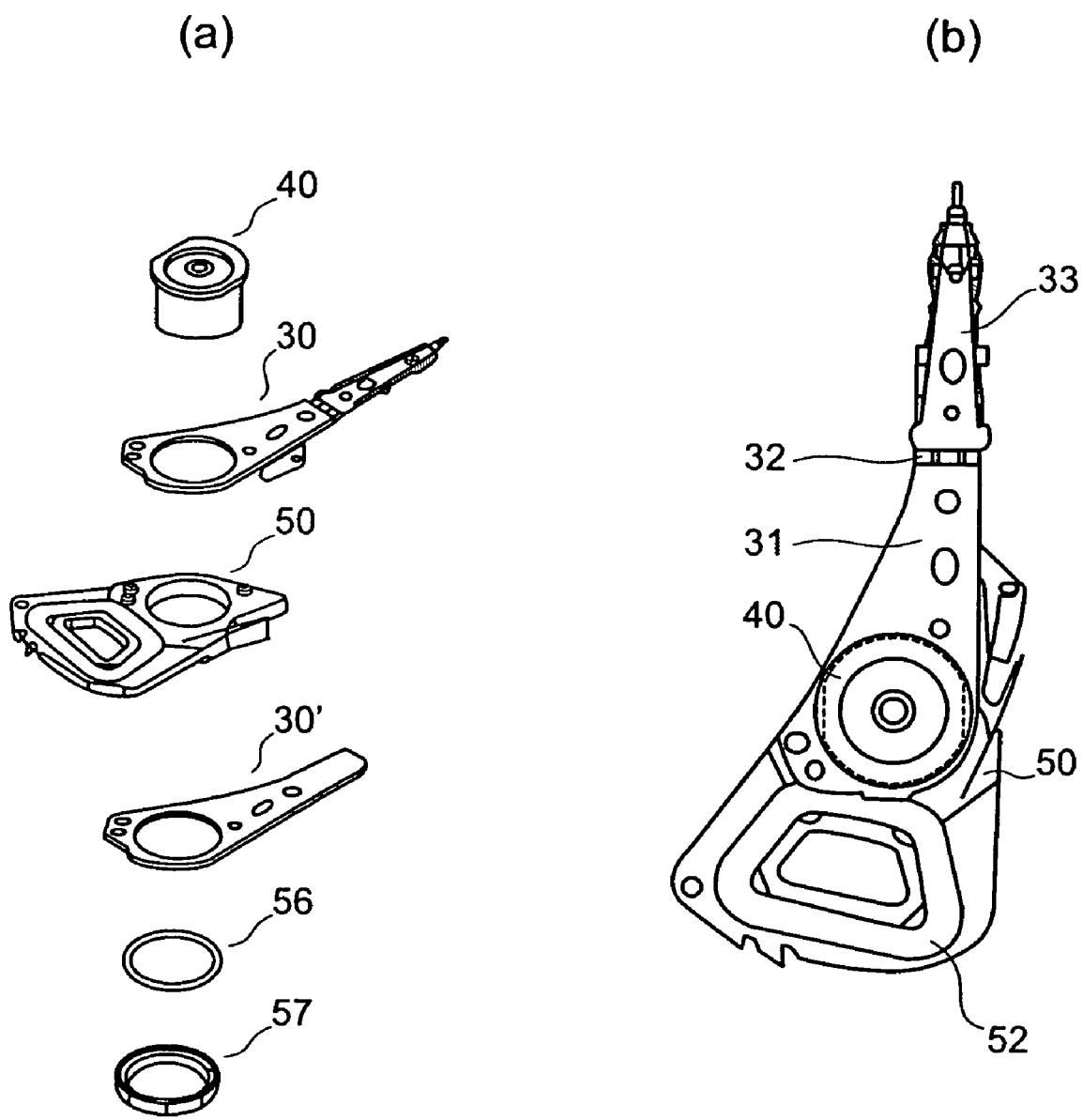
FIG. 2 is an exploded perspective view of the head stack assembly in the embodiment and a plan view of the head stack assembly after its fabrication.

FIG. 1 is a view, taken from a direction opposite a direction from which the view shown in FIG. 2 is taken, of assistance in explaining a method of assembling the head stack assembly. FIG. 1(b) shows the positional relation between the three component members. FIG. 1(a) is a view of assistance in explaining a method of adjusting alignment during its fabrication. When fabricating the head stack assembly, the alignment of the component members must be adjusted so that the distance between the centerline of the flexure 32 for supporting the magnetic head, and a line parallel to the center line of the flexure 32 and crossing the turning axis of the pivot 40 shown in FIG. 1(a) is accurately equal to a distance D. The magnetic head cannot accurately be positioned relative to the recording tracks of the magnetic disk unless the distance is adjusted accurately to the distance D.

Referring to FIG. 1(b), the head gimbal assembly 30 includes a head arm 31, a flexure 32 having one end connected to the head arm 31, and a load beam 33 connected to the flexure 32. The flexure 32 is provided integrally with wiring lines 44. The flexure 32 has elastic parts connected to the head arm 31 and the load beam 33. A gimbal for holding the magnetic head is formed in a tip part of the flexure 32. The head arm 31 is provided with a hole for receiving the pivot 40 therein. The hole of the head arm 31 has two straight edges 34. Extensions of the two straight edges 34 meet at right angles (FIG. 1(a)). The head arm 31 is provided with holes 35 for receiving bosses 51 formed in the carriage assembly 50 therein.

The carriage assembly 50 has a body to be mounted on the pivot 40, and a coil 52 included in the VCM 110 and mounted on the body. The body of the carriage assembly 50 is provided with a hole to receive the pivot 40, and the two bosses 51 to be fitted in the holes 35 of the head arm 31.

An assembling method of assembling the head stack assembly will be explained with reference to FIGS. 1(a) and 1(b). The assembling method will be described on an assumption that the head gimbal assembly 30 and the carriage assembly 50 are combined to place the head gimbal assembly 30 on the side of the upper surface of the magnetic disk to facilitate understanding the explanation. The pivot 40 is held fixedly with its head facing down by a jig provided with a groove having side walls capable of coming into close contact with the parallel flats of the head. Then, the carriage assembly 50 is put on the pivot 40. When the pivot 40 is supported on the base plate 20, the carriage assembly 50 is at its stopping position corresponding to the inner circumference of the magnetic disk. Then, the head gimbal assembly 30 is put on the pivot 40 so as to overlap the carriage assembly 50 correctly with the bosses 51 of the carriage assembly 50 fitted in the holes 34 of the head gimbal assembly 30. Then, the washer 56 is put on the pivot 40.

Subsequently, as shown in FIG. 1(*a*), a fixing member 60 is disposed in contact with the pivot 40, the carriage assembly 50 and the head gimbal assembly 30 are pressed in the direction of the arrow 70 toward the fixing member 60, and a nut 57 is screwed on the pivot 40 to fasten the head gimbal assembly 30 and the carriage assembly 50 to the pivot 40. Since the hole to receive the pivot 40 of the head gimbal assembly 30 has the two straight edges 34, the relative positions of the turning axis of the pivot 40, the head gimbal assembly 30 and the carriage assembly 50 are adjusted properly so that clearances between the parts are absorbed; that is, since forces acting on the straight edges of the hole of the head gimbal assembly 30 do not displace the center of the pivot 40, the straight edges 34 slip and the head gimbal assembly 30 turns, the center of the pivot 40 is not displaced, clearances between the parts are absorbed, and the parts are aligned accurately with each other.

Thus, the positions of the parts are corrected for alignment and hence errors in the dimensions of the head stack assembly after its fabrication can be reduced to the least possible extent. Since the accuracy in positioning the magnetic head can remarkably be improved, the present embodiment provides a portable miniature magnetic disk drive, to be mounted on a portable device, having greater capacity and smaller dimensions.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A head gimbal assembly comprising:
   a head arm consisting of a mounting hole having both rounded and only two straight edges and configured to receive a carriage support shaft therein, wherein the carriage support shaft is cylindrical and has parallel flat surfaces, wherein extensions of the two straight edges meet at right angles;
   a flexure having one end attached to the head arm and the other end including a gimbal; and
   a load beam attached to the flexure;
   wherein when the carriage support shaft is received in the mounting hole, the head gimbal assembly is capable of rotating and locking into a position relative to the straight edges of the mounting hole and the flat surfaces of the carriage support shaft.

2. The gimbal assembly according to claim 1, wherein the flexure is provided integrally with wiring lines.

3. A head stack assembly comprising:
   a cylindrical carriage support shaft having parallel flat surfaces;
   a carriage assembly having a mounting part mounted on the carriage support shaft, and a coil; and
   a head gimbal assembly including a head arm consisting of a hole having both rounded and only two straight edges and configured to receive the carriage support shaft therein, wherein extensions of the two straight edges meet at right angles;
   wherein when the carriage support shaft is received in a mounting hole, the head gimbal assembly is capable of rotating and locking into a position relative to the straight edges of the mounting hole and the flat surfaces of the carriage support shaft.

4. The head stack assembly according to claim 3, wherein the carriage assembly includes at least two bosses at least in two parts of the mounting part mounted on the carriage support shaft for positioning the head arm on the carriage assembly.

5. A head stack assembly comprising:
   a cylindrical carriage support shaft having parallel flat surfaces;
   a carriage assembly having a mounting part mounted on the carriage support shaft, and including a coil; and
   a head gimbal assembly consisting of a head arm including a hole having both rounded and only two straight edges and configured to receive the carriage support shaft therein, a flexure having one end attached to the head arm, and a load beam attached to the flexure, wherein extensions of the straight edges of the mounting hole, receiving the carriage support shaft, of the head arm meet at right angles;
   wherein when the carriage support shaft is received in the mounting hole, the head gimbal assembly is capable of rotating and locking into a position relative to the straight edges of the mounting hole and the flat surfaces of the carriage support shaft.

6. The head stack assembly according to claim 5, wherein the flexure is provided integrally with wiring lines.

7. The head stack assembly according to claim 5, wherein the carriage assembly includes at least two bosses at least two parts of the mounting part mounted on the carriage support shaft for positioning the head arm on the carriage assembly.

8. A magnetic disk drive comprising:
   a head gimbal assembly consisting of a head arm provided with a mounting hole having rounded and only two straight edges and configured to receive a carriage support shaft therein, a flexure having one end attached to the head arm, and a load beam attached to the flexure, wherein the carriage support shaft is cylindrical and has parallel flat surfaces; and
   a magnetic disk for writing information to and reading information from the magnetic disk;
   wherein when the carriage support shaft is received in the mounting hole, the head gimbal assembly is capable of rotating and locking into a position relative to the straight edges of the mounting hole and the flat surfaces of the carriage support shaft;
   wherein extensions of the two straight edges of the mounting hole of the head arm receiving the carriage support shaft therein meet at right angles.

9. A magnetic disk drive comprising:
   a head stack assembly consisting of a cylindrical carriage support shaft having parallel flat surfaces, a carriage assembly having a mounting part mounted on the carriage support shaft, and a coil, and a head gimbal assembly provided with a mounting hole having both rounded and only two straight edges and configured to receive the carriage support shaft, wherein extensions of the straight edges of the mounting hole of the head gimbal assembly receiving the carriage support shaft meet at right angles; and
   a magnetic disk to which the magnetic head write information and from which the magnetic head read information;

wherein when the carriage support shaft is received in the mounting hole, the head gimbal assembly is capable of rotating and locking into a position relative to the straight edges of the mounting hole and the flat surfaces of the carriage support shaft.

10. The magnetic disk drive according to claim 9, wherein the carriage assembly includes at least two bosses at least in two parts of the mounting part mounted on the carriage support shaft for positioning the head gimbal assembly on the carriage assembly.

11. A magnetic disk drive comprising:
a cylindrical carriage support shaft having parallel flat surfaces;
a carriage assembly having a mounting part mounted on the carriage support shaft, and a coil;
a head arm consisting of a mounting hole having both rounded and only two straight edges and configured to receive the carriage support shaft therein, wherein extensions of the straight edges of the mounting hole of the head arm receiving the carriage shaft meet at right angles;
a flexure having one end attached to the head arm and the other end including a gimbal;
a load beam attached to the flexure and capable of loading the gimbal;
a magnetic head attached to the gimbal; and
a magnetic disk to which the magnetic head write information and from which the magnetic head read information
wherein when the carriage support shaft is received in the mounting hole, and the head arm is capable of rotating and locking into a position relative to the straight edges of the mounting hole and the flat surfaces of the carriage support shaft.

12. The magnetic disk drive according to claim 11, wherein the flexure is provided integrally with wiring lines.

13. The magnetic disk drive according to claim 11, wherein the carriage assembly includes at least two bosses at least in two parts of the mounting part mounted on the carriage support shaft for positioning the head arm on the carriage assembly.

* * * * *